(12) United States Patent
Ohta

(10) Patent No.: US 7,879,149 B2
(45) Date of Patent: Feb. 1, 2011

(54) VACUUM PROCESSING APPARATUS

(75) Inventor: Yuichiro Ohta, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 105 days.

(21) Appl. No.: 10/796,344

(22) Filed: Mar. 9, 2004

(65) Prior Publication Data
US 2004/0177810 A1 Sep. 16, 2004

(30) Foreign Application Priority Data
Mar. 11, 2003 (JP) ............................. 2003-065086

(51) Int. Cl.
C23C 16/00 (2006.01)
G02F 1/1339 (2006.01)
(52) U.S. Cl. ...................... 118/715; 349/190
(58) Field of Classification Search .............. 118/715; 349/190
See application file for complete search history.

(56) References Cited
U.S. PATENT DOCUMENTS

| 1,559,804 | A | * | 11/1925 | Sweeny | 55/315 |
| 2,663,894 | A | * | 12/1953 | Elliotte | 15/340.1 |
| 3,326,512 | A | * | 6/1967 | Clarke | 251/86 |
| 3,380,288 | A | * | 4/1968 | Bradley | 73/9 |
| 4,065,118 | A | * | 12/1977 | Dudley | 271/14 |
| 6,052,888 | A | * | 4/2000 | Bird | 29/523 |
| 6,065,780 | A | * | 5/2000 | Hiroshima | 285/49 |
| 2003/0116432 | A1 | * | 6/2003 | Schweitzer et al. | 204/298.11 |
| 2004/0177810 | A1 | * | 9/2004 | Ohta | 118/718 |
| 2005/0013703 | A1 | * | 1/2005 | Cafri et al. | 417/363 |

FOREIGN PATENT DOCUMENTS

| JP | 56-064195 |   | 6/1981 |
| JP | 57-116947 |   | 7/1982 |
| JP | 59-67849 |   | 5/1984 |
| JP | 61-008479 |   | 1/1986 |
| JP | 62-54287 |   | 4/1987 |
| JP | 04083973 | A * | 3/1992 |
| JP | 05-340497 |   | 12/1993 |
| JP | 08029122 | A * | 2/1996 |
| JP | 08-145270 |   | 6/1996 |
| JP | 2001-305563 |   | 10/2001 |
| JP | 2002-229044 |   | 8/2002 |
| JP | 2002-236276 |   | 8/2002 |
| JP | 2007-165232 | * | 6/2007 |
| SG | 117403 |   | 5/2006 |

* cited by examiner

*Primary Examiner*—Jeffrie R Lund
(74) *Attorney, Agent, or Firm*—Greer, Burns & Crain, Ltd.

(57) ABSTRACT

The vacuum processing apparatus includes a vacuum chamber, a vacuum pump, and a pipe 30 connecting the vacuum chamber to the vacuum pump to evacuate the vacuum chamber. A flexible pipe is included as a part of the pipe, and a mechanism for fixing the flexible pipe so as not to shrink at the time of evacuation. The mechanism includes a bar for fixing the vacuum pump side of the flexible pipe to a floor. In an embodiment, the vacuum processing apparatus is a substrate bonding apparatus for fabricating a display device.

7 Claims, 5 Drawing Sheets

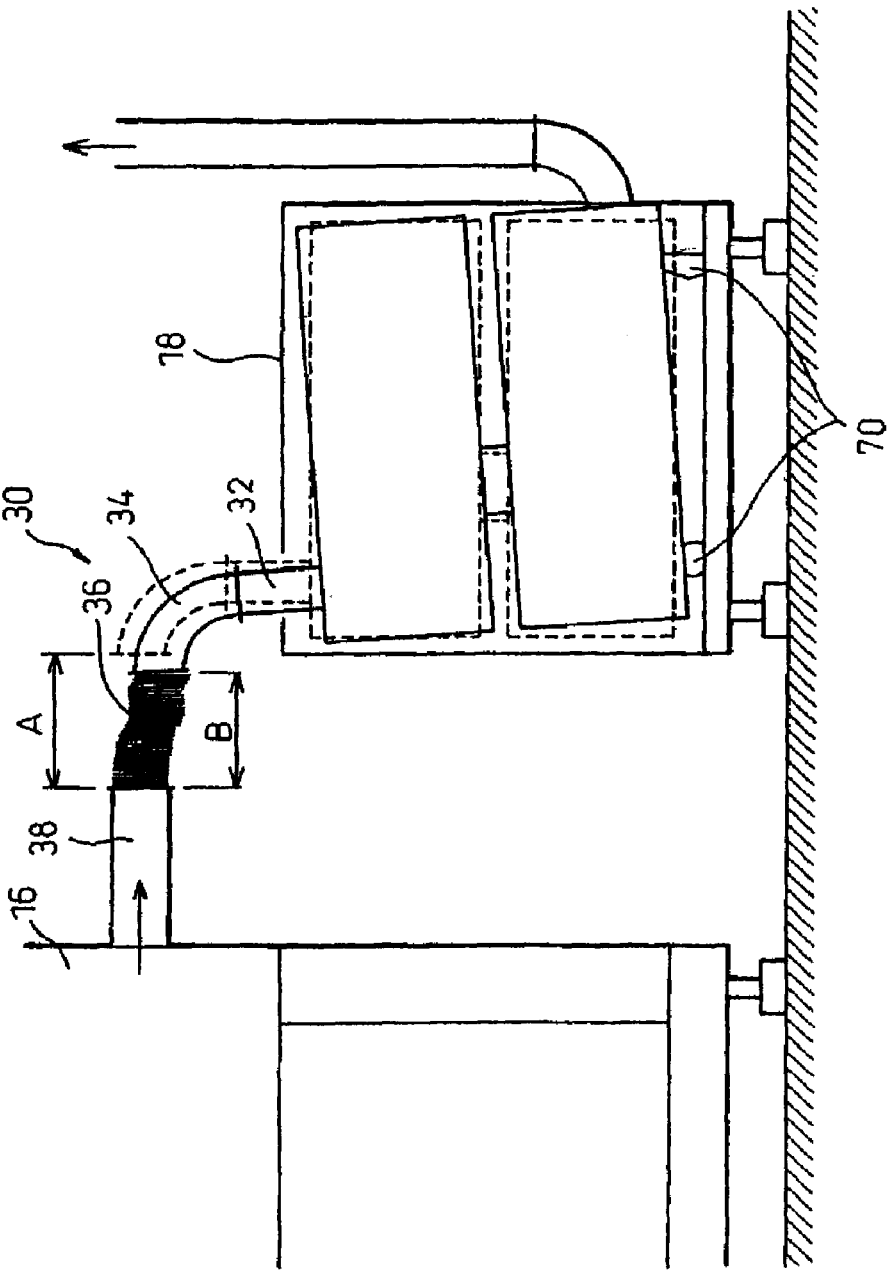

VACUUM PROCESSING APPARATUS

BACKGROUND OF THE INVENTION

1. Field of the Invention

The present invention relates to a vacuum processing apparatus having a vibration dampening mechanism and, in particular, to a substrate bonding apparatus for a liquid crystal display device.

2. Description of the Related Art

The substrate bonding device for the liquid crystal display device is constructed such that the alignment marks of a pair of substrates are read by CCD cameras or the like in the vacuum chamber and, based on the result, the positions of a pair of substrates are corrected and the substrates are then bonded together (see Japanese Unexamined Patent Publication No. 2001-305563 and No. 2002-229044, for example). In the substrate bonding device, a vacuum chamber and a vacuum pump are connected by a pipe so that the vacuum chamber is evacuated (pressure is reduced) by the vacuum pump.

In the case where the substrates are small in size, the volume of the vacuum chamber is small and, therefore, a vacuum pump having smaller displacement can be used. In such a case, the vibration of the vacuum pump has no effect on the vacuum chamber. In the case where the accuracy of bonding the substrates is not extremely high, the vibration transmitted from the vacuum pump to the vacuum chamber has substantially no effect on the operation of bonding the substrate.

In fabricating a liquid crystal display device, a plurality of substrates corresponding to a plurality of liquid crystal panels are acquired from one glass substrate. In order to reduce the unit price of each liquid crystal panel, the glass substrate size has been increased to allow as many liquid crystal panel substrates as possible to be obtained from a single glass substrate. With the increase in the size of the glass substrate, the equipment for processing the glass substrates has been proportionately increased in size, with the result that the substrate bonding device in which the alignment marks are read by the CCD cameras or the like in vacuum and the substrates are bonded together poses the problem described below.

An increased size of the glass substrate increases the volume of the vacuum chamber, and therefore requires a vacuum pump of a large displacement to increase the throughput. However, this poses the problems of a larger vibration of the vacuum pump which is transmitted to the vacuum chamber through a vacuum pipe, and the resulting vibration of the CCD cameras and the glass substrate in the vacuum chamber makes the alignment operation impossible, thereby leading to the problem that the throughput is reduced due to the deviation of the substrate bonding and the retries of the alignment operation.

A flexible pipe of a bellows type is sometimes connected as a part of the pipe connecting the vacuum chamber and the vacuum pump. The flexible pipe has the function of suppressing the transmission of vibration from the vacuum pump to the vacuum chamber. In the case of a vacuum pump of a large displacement, however, the vibration transmission damping function of the flexible pipe transmission has no great effect of suppressing the vibration transmitted. The use of a long flexible pipe would lengthen the evacuation time due to an increased evacuation gas resistance, resulting in an adverse effect on the throughput. Also, a long flexible pipe connected cannot effectively suppress the vibration transmission.

Further, as the pattern on the liquid crystal display device becomes more and more detailed, demand has increased than ever before for a higher accuracy of the substrate bonding in the substrate bonding apparatus.

In this way, in the vacuum processing apparatus comprising a vacuum chamber, a vacuum pump and a pipe connecting the vacuum chamber to the vacuum pump to evacuate the vacuum chamber, the problem is that the vibration of the vacuum pump is transmitted to the vacuum chamber and adversely affects the processing in the vacuum chamber.

SUMMARY OF THE INVENTION

The object of the present invention is to provide a vacuum processing apparatus having a mechanism for suppressing the transmission of vibration from the vacuum pump to the vacuum chamber.

The vacuum processing apparatus, according to the present invention, comprises a vacuum chamber, at least one vacuum pump, a pipe connecting the vacuum chamber to the vacuum pump for evacuating the vacuum chamber, a flexible pipe included in a part of the pipe, and a mechanism for fixing the flexible pipe so as not to shrink at the time of evacuation.

According to the inventor's consideration, the vibration of the vacuum pump is transmitted to the vacuum chamber due to the fact that the flexible pipe is shrunk and loses the flexibility, i.e. the function of suppressing the transmission of the vibration. In view of this, according to the present invention, the flexible pipe is fixed by the mechanism so as not to shrink at the time of evacuation and thereby to prevent the vibration of the vacuum pump from being transmitted to the vacuum chamber. Further, according to the present invention, the vibration is successfully prevented from being transmitted to the vacuum chamber without adversely affecting the exhaust rate, i.e. without reducing the throughput.

BRIEF DESCRIPTION OF THE DRAWINGS

The present invention will become more apparent from the following description of the preferred embodiments, with reference to the accompanying drawings, in which:

FIG. 8 is a view explaining the shrinkage of the flexible pipe at the time of evacuation.

DESCRIPTION OF THE PREFERRED EMBODIMENTS

Figure 1:
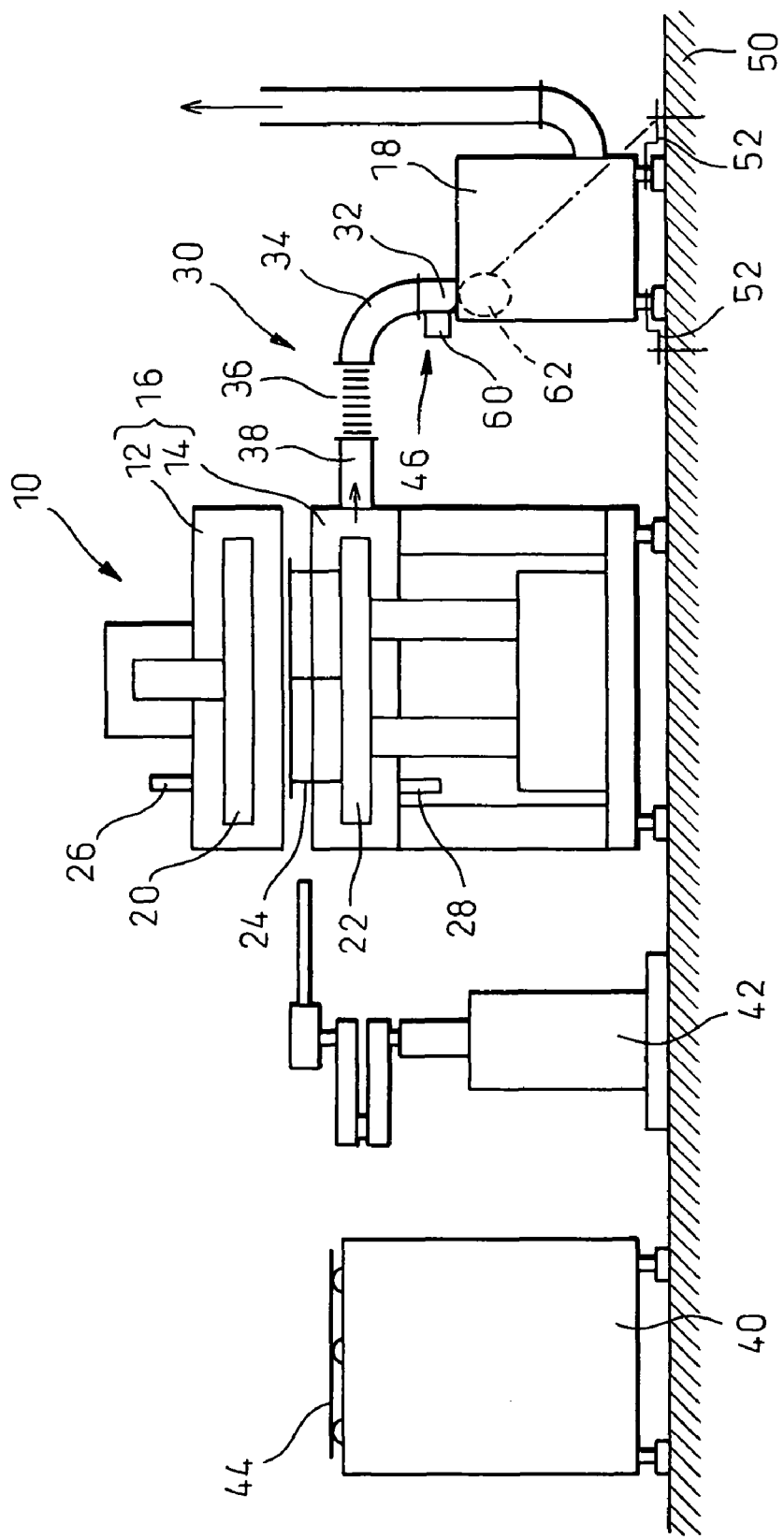
FIG. 1 is a view showing a substrate bonding apparatus having a vibration dampening mechanism according to an embodiment of the invention.

FIG. 1 is a view showing a substrate bonding apparatus having a vibration dampening mechanism according to an embodiment of the present invention. The substrate bonding apparatus is an example of the vacuum processing apparatus according to the present invention, and the present invention is not limited to the illustrated example.

The substrate bonding apparatus 10 comprises a vacuum chamber 16 including an upper cover 12 and a lower cover 14, and a vacuum pump 18 arranged near the vacuum chamber 16. The upper cover 12 is movable vertically with respect to the lower cover 14. When the upper cover 12 moves upward with respect to the lower cover 14, the vacuum chamber 16 is opened, while when the upper cover 12 moves downward with respect to the lower cover 14, the vacuum chamber 16 is closed.

An upper chuck plate 20 and a lower chuck plate 22 are arranged in the vacuum chamber 16. The upper chuck plate 20 and the lower chuck plate 22 are movable, respectively. For example, the upper chuck plate 20 is vertically movable with respect to the lower chuck plate 22, and the lower chuck plate 22 is movable in X-Y direction and in the θ direction. Each of the upper chuck plate 20 and the lower chuck plate 22 has the function of an electrostatic chuck and a vacuum attraction chuck. Further, a lift pin 24 is arranged vertically movably in the lower chuck plate 22. The free end of the lift pin 24 is normally located below the surface of the lower chuck plate 22.

A CCD camera 26 is mounted on the upper cover 12, and a CCD camera 28 on the lower cover 14.

The vacuum pump 18 is connected to the vacuum chamber 16 (the lower cover 14 in the example shown) by a pipe 30. The pipe 30 includes an inlet pipe 32 extending upward from the vacuum pump 18, an elbow pipe 34, a bellows-like flexible pipe 36 and a straight pipe 38 connected to the vacuum chamber 16. The inlet pipe 32, the elbow pipe 34, the flexible pipe 26 and the straight pipe 38 are formed of stainless steel, or a like metal, for example.

Figure 4:
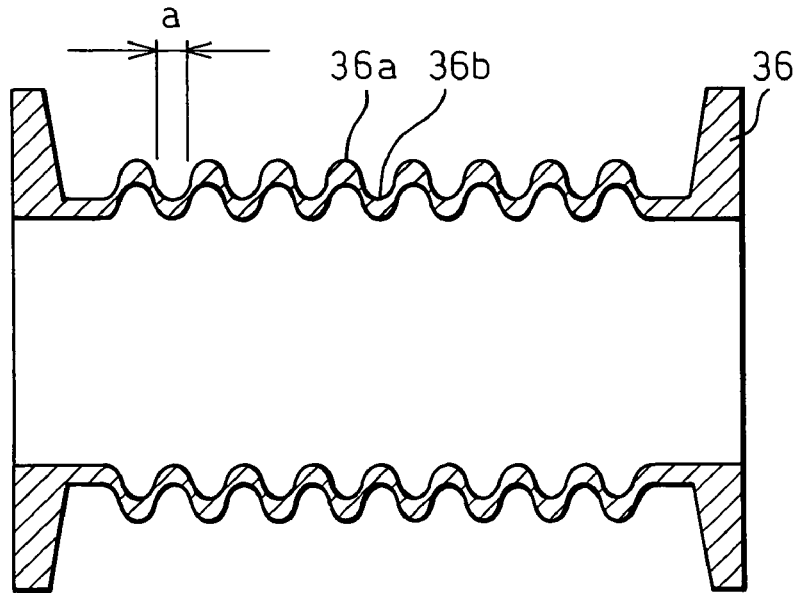
FIG. 4 is a view showing the flexible pipe in the initial state.
Figure 5:
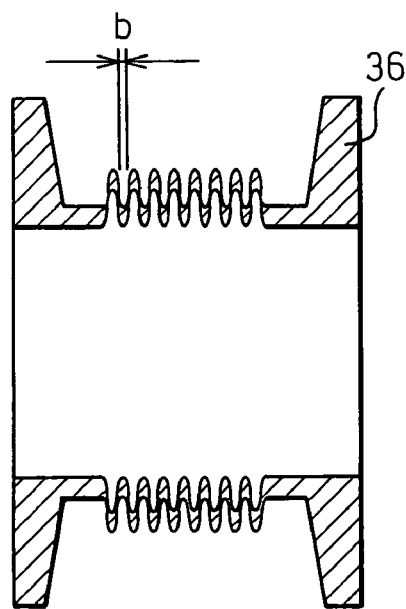
FIG. 5 is a view showing the flexible pipe in the shrunk state.

As shown in FIGS. 4 and 5, the flexible pipe 36 has ridges 36a and troughs 36b and can be relatively easily deformed in spite of it being made of a metal material. FIG. 4 shows the flexible pipe 36 in the initial state with the troughs 36b having the width of "a". FIG. 5 shows the flexible pipe 36 in the shrunk state with the troughs 36b having the width of "b". The ridges 36a and the troughs 36b of the flexible pipe 36 are easily deformed, and therefore the flexible pipe 36 has the function of absorbing the positional deviation between the elbow pipe 34 and the straight pipe 38 and the function of suppressing the transmission of the vibration of the vacuum pump 18 to the vacuum chamber 16.

In FIG. 1, a conveyor 40 and a substrate conveyance robot 42 are arranged upstream of the vacuum chamber 16. Further, a substrate conveyance robot and a conveyor (not shown) are arranged downstream of the vacuum chamber 16. The conveyor 40 and the substrate conveyance robot 42 supply substrates (glass substrates) 44 to the vacuum chamber 16. The substrates 44 make up a liquid crystal display device. One substrate 44 is held by the upper chuck plate 20 and another substrate 44 by the lower chuck plate 22.

Further, according to the present invention, a mechanism 46 is provided for fixing the flexible pipe 36 so as not to shrink at the time of evacuation. First, the operation of the shrinkage of the flexible pipe 36 at the time of evacuation is explained.

FIG. 8 is a view explaining the shrinkage of the flexible pipe 36 at the time of evacuation. The substrate bonding apparatus shown in FIG. 8 is identical to the substrate bonding apparatus 10 shown in FIG. 1, except that the substrate bonding apparatus of FIG. 8 lacks the mechanism 46 for fixing the flexible pipe 36 so as not to shrink at the time of evacuation. The vacuum pump 18 is connected to the vacuum chamber 16 by the pipe 30. The pipe 30 includes the inlet pipe 32 extending from the vacuum pump 18, the elbow pipe 34, the bellows-like flexible pipe 36 and the straight pipe 38 connected to the vacuum chamber 16.

In FIG. 8, the vacuum pump 18 and the pipe 30 when they are not operated are indicated by dashed lines, while the vacuum pump 18 and the pipe 30 in operation are indicated by solid lines. When the evacuation of the vacuum chamber 16 is started or the vacuum pump 18 is switched on, the gas attracting force occurs between the vacuum pump 18 and the vacuum chamber 16. As a result, the flexible pipe 36 shrinks so that the vacuum pump 18 which is considerably lighter in weight than the vacuum chamber 16 is attracted toward the vacuum chamber 16. Thus, the vacuum pump 18 is tilted as shown by a solid line. In other words, the flexible pipe 36 changes from a state in which it has a size "A" corresponding to the length of the flexible pipe 36 shown in FIG. 4 to a state in which it has a size "B" corresponding to the length of the flexible pipe 36 shown in FIG. 5.

In the case where the vacuum pump 18 of a large displacement is used, the resulting large gas attraction force between the vacuum pump 18 and the vacuum chamber 16 is large and the shrunk state of the flexible pipe 36 is maintained. Thus, the interval between the ridges 36a and the troughs 36b of the flexible pipe 36 is reduced as shown in FIG. 5 and the flexibility of the flexible pipe 36 is reduced. As a result, the function of the flexible pipe 36 to suppress the transmission of vibration is deteriorated.

Consequently, the vibration of the vacuum pump 18 is transmitted to the vacuum chamber 16 through the pipe 30, and causes the CCD cameras 26 and 28 and the glass substrates 44 to vibrate in the vacuum chamber 16, resulting in that a stable alignment operation becomes impossible. This leads to the problems of the positional deviation of the substrates 44 while they are bonded together and a lower throughput due to retries to obtain alignment. This problem cannot be solved simply by increasing the length of the flexible pipe 36.

Thus, the mechanism 46 is provided for fixing the flexible pipe 36 so as not to shrink at the time of the evacuation thereby to keep the flexible pipe 36 in the state shown in FIG. 4. Once the flexible pipe 36 is maintained in the state shown in FIG. 4, the ridges 36a and the troughs 36b of the flexible pipe 36 have an interval large enough to move with considerable freedom. Thus, the flexibility of the flexible pipe 36 is guaranteed, and the flexible pipe 36 works to suppress the transmission of the vibration.

Figure 2:
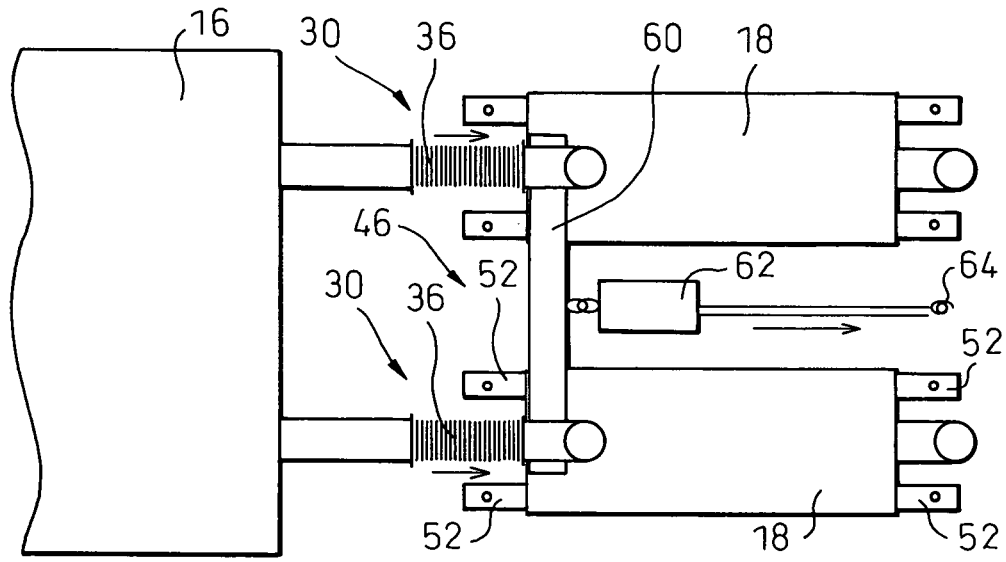
FIG. 2 is a partially enlarged plan view of the substrate bonding apparatus of FIG. 1.
Figure 3:
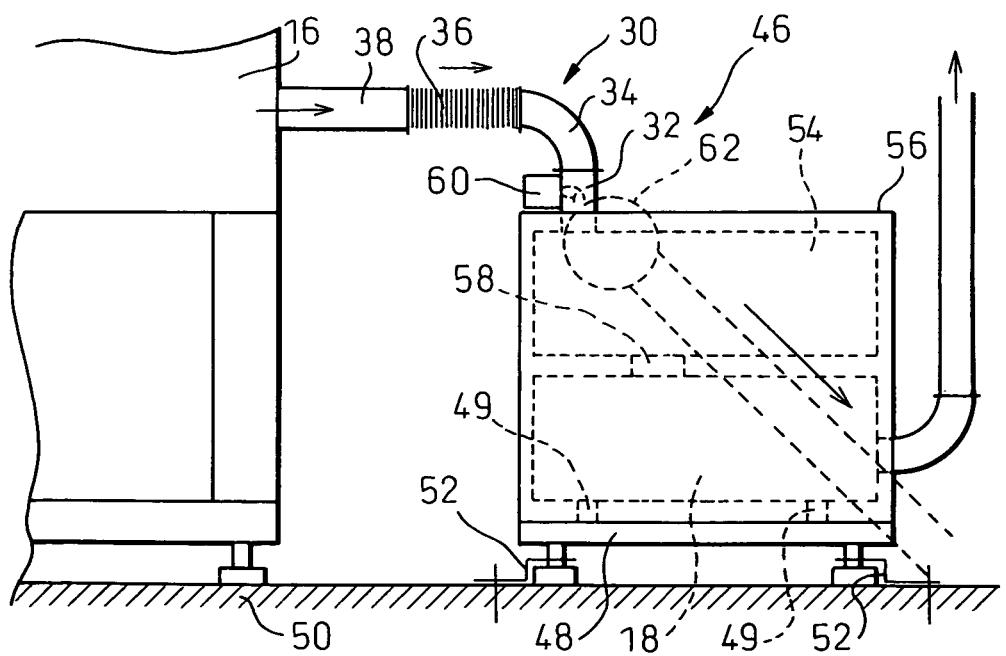
FIG. 3 is a side view of the substrate bonding apparatus of 2.

FIG. 2 is a partially enlarged plan view of the substrate bonding apparatus 10. FIG. 3 is a side view of the substrate bonding apparatus 10 shown in FIG. 2. In FIGS. 1 to 3, two vacuum pumps 18 are provided for one vacuum chamber 16. The two vacuum pumps 18 are connected to the vacuum chamber 16 by the pipes 30. The two pipes 30 extend in parallel to each other. Base frame 48 of each vacuum pump 18 is fixed to a floor panel 50 by fittings 52. The vacuum pump 18 is placed on the base frame 48 through a cushion member 49. A mechanical booster (auxiliary pump) 54 constituting a part of the vacuum pump 18 is arranged on the vacuum pump 18. A cover 56 protects the vacuum pump 18 and the mechanical booster 54. The mechanical booster 54 is connected to the vacuum pump 18 by a connecting pipe 58, and the inlet pipe 32 extends upward from the mechanical booster 54.

The mechanism 46 for fixing the flexible pipe 36 so as not to shrink at the time of evacuation includes a quadrangular (rectangular or square) bar 60 with a suspension bolt for fixing the flexible pipe 36 of the vacuum pump 18 side. The quadrangular bar 60 extends horizontally between the inlet pipes 32 rising upward from the respective vacuum pumps 18 and is fixed at the rising portion of the inlet pipes 32. The quadrangular bar 60 is a long member extending over the two vacuum pumps 18. One end of a chain block 62 is fixed to the suspension bolt arranged at the center of the quadrangular bar 60. The other end of the chain block 62 is fixed to a fixing block 64 arranged on the floor panel 50. The chain block 62 is operated in the direction to expand the flexible pipe 36. The quadrangular bar 60 fixes the flexible pipes 36 through the inlet pipes 32 and the elbow pipes 34 so as not to shrink.

As described above, the mechanism 46 includes the quadrangular bar (member) 60 fixed to the inlet pipes (pipe portions) 32 extending upward from the vacuum pumps 18, and the chain block (coupling member) 62 connecting the quadrangular bar 60 to the floor panel (fixing structure) 50. The mechanism 46 according to the present invention is very simple and inexpensive. The quadrangular bar 60 and the chain block 62 are required to have a sufficient durability as calculated from the evacuation capacity of the vacuum pumps 18.

In operation, two substrates 44 to be bonded to each other are supplied to the vacuum chamber 16 by the conveyor 40 and the substrate conveyance robot 42. The substrates 44 are set to the electrostatic chuck plates 20 and 22 by the substrate conveyance robot 42. In the situation, the substrates 44 are held by the electrostatic chuck plates 20, 22 by vacuum attraction to assure stable chucking.

After two substrates 44 are set, the upper cover 12 of the vacuum chamber 16 is moved down with respect to the lower cover 14 thereby to close the vacuum chamber 16. At the same time, the attraction of the substrates 44 is switched from the vacuum attraction to the electrostatic attraction. After that, the vacuum chamber 16 is evacuated by the vacuum pumps 18 connected thereto through the pipes 30 including the vibration dampening mechanisms.

After the vacuum chamber 16 is evacuated to a predetermined vacuum level, the upper chuck plate 20 is moved down to a position where the two substrates 44 are almost in contact with each other. Observing the alignment marks of the substrates 44 by the CCD cameras 26 and 28, the amount of deviation between the two substrates 44 is calculated and the deviation is corrected by the calculated value. The deviation can be corrected by various methods. According to this embodiment, the deviation is corrected by moving the lower chuck plate 22. Upon complete correction according to the alignment marks of the substrates 44, the upper electrostatic chuck plate 20 is pressed against the lower electrostatic chuck plate 22 under a predetermined pressure thereby to bond the substrates 44 to each other.

Upon complete bonding of the substrates 44 to each other by the series of steps described above, the attraction by the electrostatic chuck is stopped. The vacuum chamber 16 is exposed to the atmosphere and then opened. The lift pin 24 arranged in the lower electrostatic chuck plate 22 rises and lifts the bonded substrate assembly. The bonded substrate assembly lifted is removed out of the process by the conveyance robot installed downstream, followed by entering the next operation of bonding the substrates.

As described above, in the prior art, when the alignment marks on the substrates 44 are observed by the CCD cameras 26 and 28 after the evacuation, the vibration of the vacuum pump 18 which increases as the size of the vacuum pump 18 causes the vacuum chamber 16 and the CCD cameras 26 and 28 to vibrate through the pipe 30, thereby making it impossible to recognize the accurate position of the alignment marks. In this way, the problem of a reduced throughput and the deviation of the substrates is encountered. Also, in the case where the vacuum pump 18 is installed with adjusting bolts, the whole vacuum pump is displaced by the gas attracting force. To obviate these problems, an attempt has been made to change the method of installing (fixing) the vacuum pump, i.e. to fix the vacuum pump on the floor panel (grating). This attempt, however, has failed when the pump is fallen (tilted) due to the deformation (fall) of the cushion member 70 (FIG. 8) in the vacuum pump for supporting the pump and the pump housing, resulting in the shrinkage of the flexible pipe.

In view of this, according to the present invention, the vacuum pump 18 side of the flexible pipe 36 is fixed by the quadangle bar 60. In this way, the flexible pipe 36 is fixed in such a manner as not to shrink under the gas attraction force at the time of evacuation and thus is prevented from being shrunk. In this way, the ridges 36a and the troughs 36b of the flexible pipe 36 are made deformable so that the transmission of the vibration of the vacuum pump 18 to the vacuum chamber 16 is suppressed.

To fix the vacuum pump 18 when starting it may appear to be a good idea to prevent the shrinkage of the flexible pipe 36, but this idea cannot be easily (or inexpensively) carried out since the attraction force of the vacuum pump 18 is strong. This idea, however, has been realized by this invention. Also, it should be noted that the apparatus described above is only an example, to which the invention is not limited.

Figure 6:
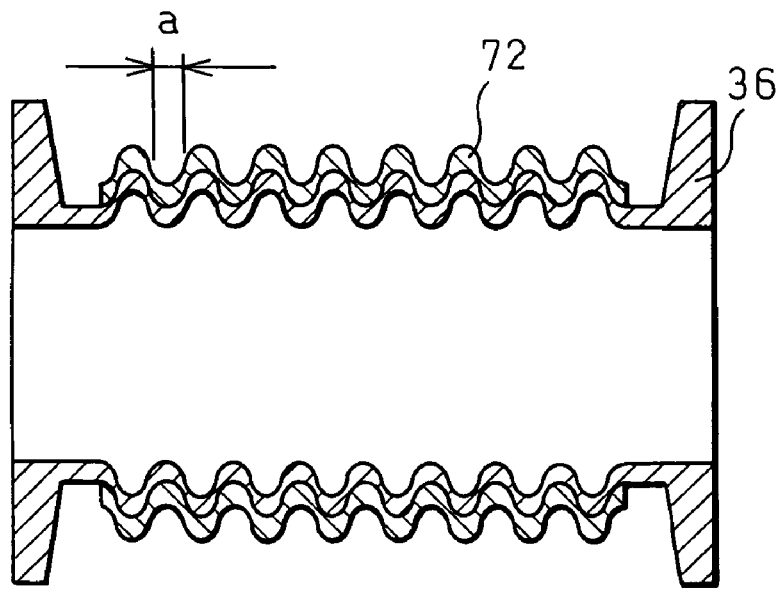
FIG. 6 is a view showing a modification of the flexible pipe in the initial state.
Figure 7:
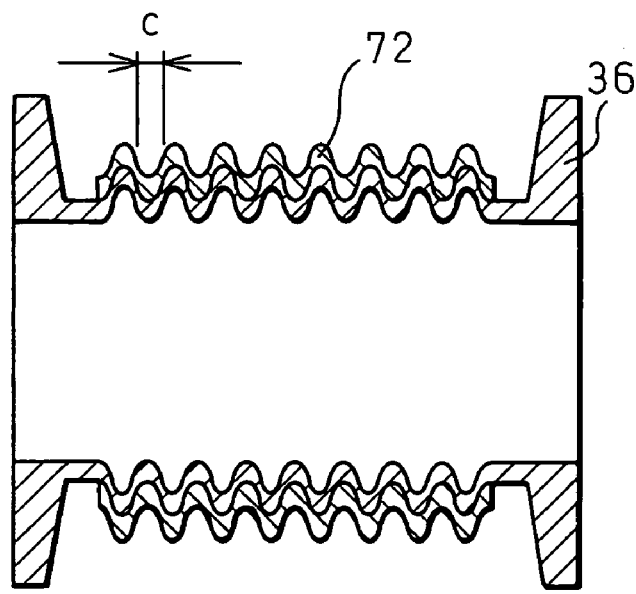
FIG. 7 is a view showing the modification of the flexible pipe in the shrunk state.

FIG. 6 is a view showing a modification of the flexible pipe in the initial state. FIG. 7 is a view showing the modification of the flexible pipe in the shrunk state. In these modifications, the surface of the flexible pipe 36 is coated with a layer 72 for suppressing the shrinkage of the flexible pipe 36. The layer 72, which is a coating of rubber or resin, not only suppresses the shrinkage but also prevents minor vibrations (chattering) of the flexible pipe 36.

As described above, according to the present invention, the transmission of the vibration of the vacuum pump to the vacuum chamber can be reduced to such an extent as to eliminate the adverse effect on the normal operation, and therefore the quality of the product processed in the vacuum chamber is improved. In the case where the product processed in the vacuum chamber is the one completed by bonding two parts to each other, the deviation between the parts to be attached is eliminated for an improved throughput.

The invention claimed is:

1. A vacuum processing apparatus comprising:
    a floor panel;
    a fixing block connected to the floor panel;
    a vacuum chamber provided on the floor panel;
    a pair of vacuum pumps provided on the floor panel, said vacuum pumps being fixed to the floor panel near bottom portions thereof;
    a pipe connecting the vacuum chamber to each of the vacuum pumps for evacuating the vacuum chamber;
    a flexible pipe included in a part of the pipe;
    an inlet pipe included in a part of the pipe for connecting the flexible pipe to each of the corresponding vacuum pumps; and
    a mechanism that includes a bar fixed to each of a rising portion of the inlet pipes and a chain block fixed to a central part of the bar and the fixing block, said mechanism being connected via a first connection to the fixing block, at one end thereof, and being connected via a second connection to top parts of each of the vacuum pumps, at an opposite end thereof, wherein said mechanism is configured and arranged to maintain a distance between the inlet pipe and the fixing block in an extending direction of the flexible pipe so as not to shrink the flexible pipe, in the extending direction, at a time of evacuation, wherein:
    each of the vacuum pumps are provided in parallel with each other with a gap therebetween, and
    the mechanism is provided between the vacuum pumps.

2. The vacuum processing apparatus according to claim 1, wherein:
    the inlet pipe is provided on the top part of each of the corresponding vacuum pumps.

3. The vacuum processing apparatus according to claim 1, wherein:
the chain block is provided between the vacuum pumps.

4. The vacuum processing apparatus according to claim 3, wherein:
the inlet pipe is provided on a vacuum chamber-side of the top part of each of the corresponding vacuum pumps, and
the fixing block is provided between the vacuum pumps and on an opposite side with respect to the vacuum chamber.

5. The vacuum processing apparatus according to claim 1, wherein each of said vacuum pumps is seated upon a plurality of cushion members, which are positioned between said vacuum pump and an associated base member, and further wherein said base members are attached to the floor panel.

6. The vacuum processing apparatus according to claim 1, wherein said bar is a quadrangular bar.

7. The vacuum processing apparatus according to claim 1, wherein said chain block operates in a direction to expand the flexible pipe.

* * * * *